March 15, 1927.   J. T. FAGAN ET AL   1,621,359
GLASS WORKING MACHINE
Filed Feb. 7, 1921   3 Sheets-Sheet 1

INVENTORS:
JOHN T. FAGAN,
JOHN J. MALLOY,
BY Albert G. Davis
THEIR ATTORNEY

March 15, 1927.
J. T. FAGAN ET AL
1,621,359
GLASS WORKING MACHINE
Filed Feb. 7, 1921 3 Sheets-Sheet 2
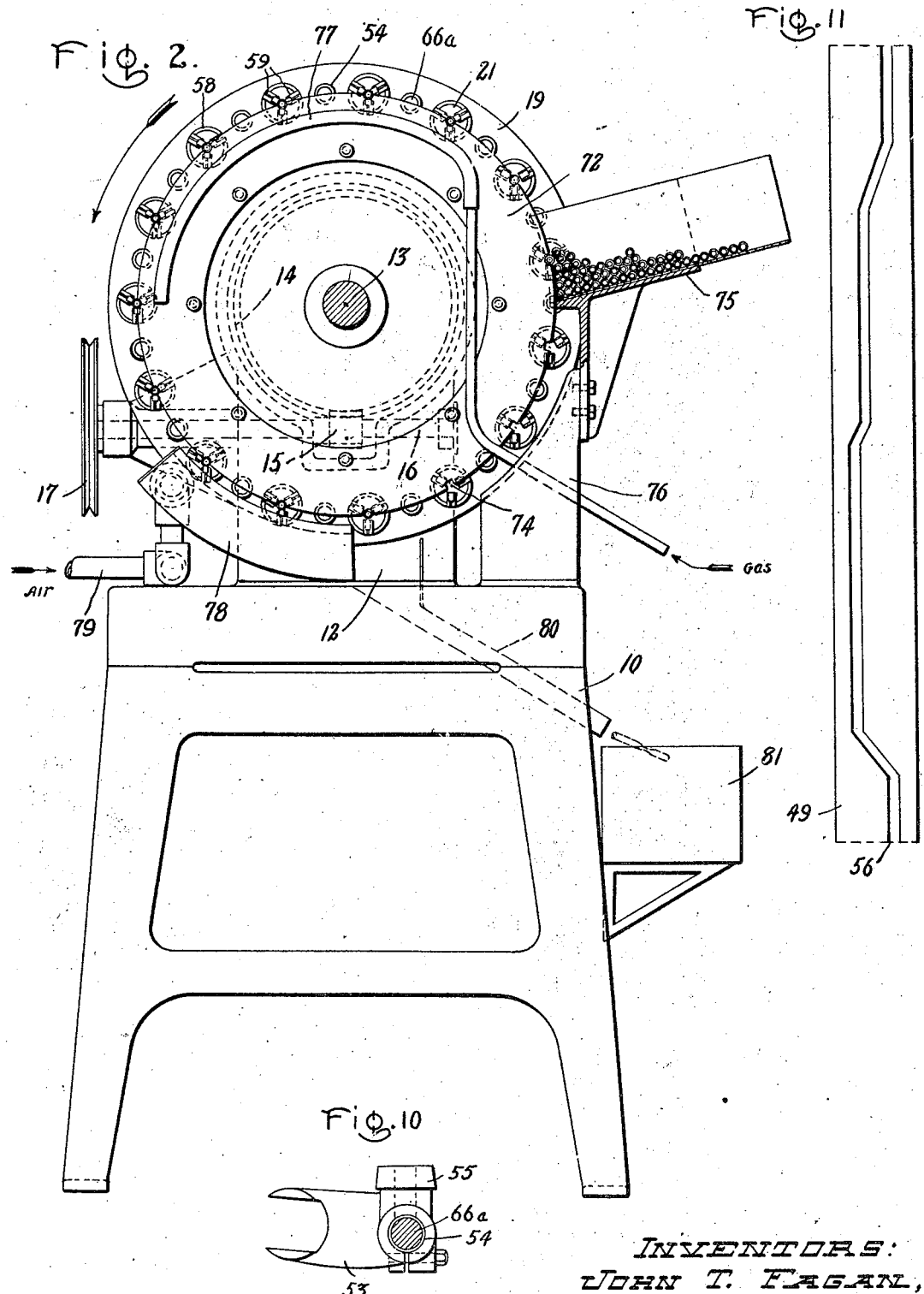
INVENTORS:
JOHN T. FAGAN,
JOHN J. MALLOY,
BY
THEIR ATTORNEY.

March 15, 1927.   J. T. FAGAN ET AL   1,621,359
GLASS WORKING MACHINE
Filed Feb. 7, 1921   3 Sheets-Sheet 3
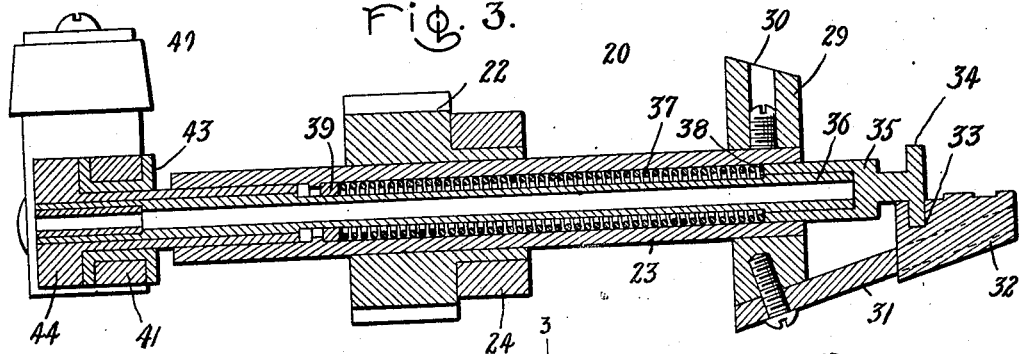
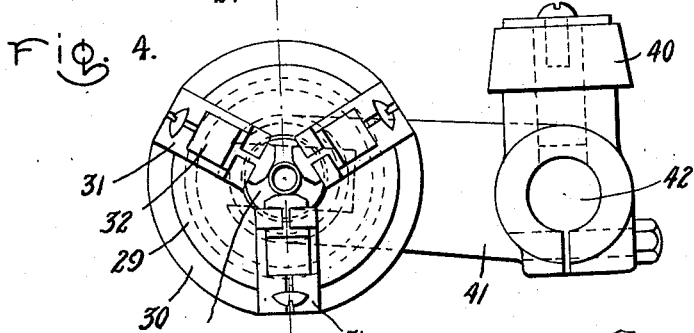
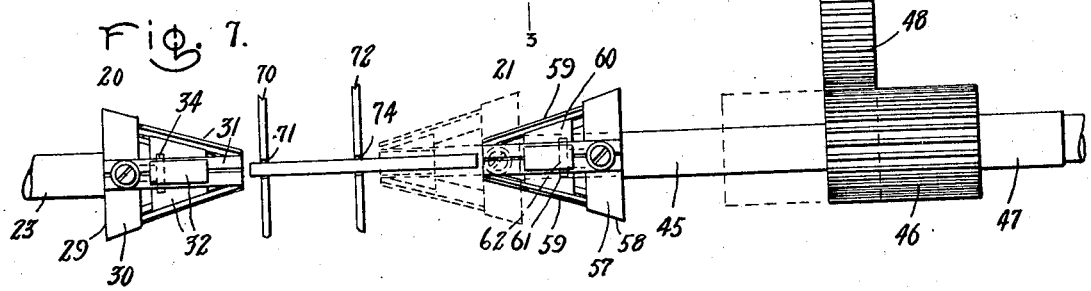
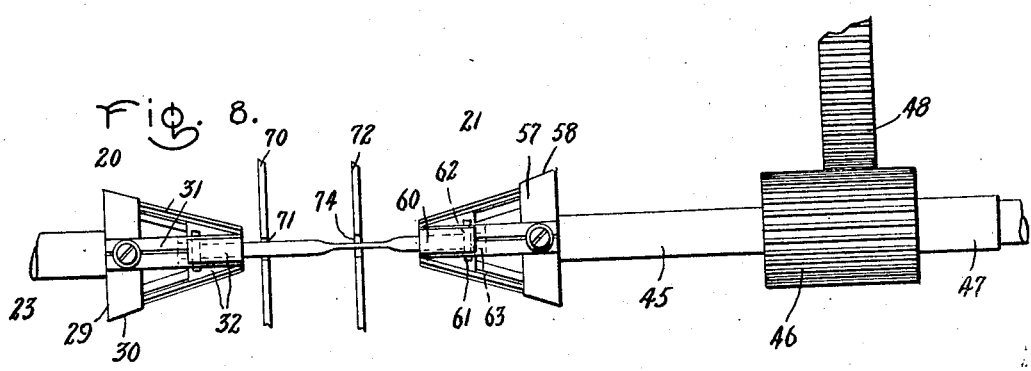
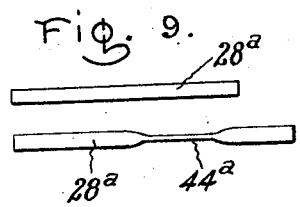
INVENTORS:
JOHN T. FAGAN,
JOHN J. MALLOY,
BY
THEIR ATTORNEY.

Patented Mar. 15, 1927.

1,621,359

UNITED STATES PATENT OFFICE.

JOHN T. FAGAN AND JOHN J. MALLOY, OF CLEVELAND, OHIO, ASSIGNORS TO GENERAL ELECTRIC COMPANY, A CORPORATION OF NEW YORK.

GLASS-WORKING MACHINE.

Application filed February 7, 1921. Serial No. 442,958.

Our invention relates to glass working machines and more particularly to glass working machines for producing changes of form in glass tubes One article which is readily made by means of our invention is the contracted tube which is used as an exhaust tube for electric incandescent lamps.

One of our objects is to produce a glass tube having a contraction formed therein suitable for use as an exhaust tube in an incandescent electric lamp such as disclosed in the Mitchell and White application, Serial No. 283,801, although the machine embodying our invention is not limited in use thereto. In order that a contraction tube be suitable for use as an exhaust tube, the contraction should be a definite distance from the end of the tube and the contraction of each tube should be uniform with that of any other. Moreover, the finished tube should be straight. To accomplish this result, we prefer to employ means to definitely center the glass tube in the machine and means to heat the glass tube locally a definite distance from the end thereof so as to properly locate the contraction. We then apply a gradual pull longitudinally of the tube to form a contraction thereon. We prefer to rotate the glass tube while it is being worked.

More specifically, we have provided an automatic machine in which a series of glass tubes is fed to a constantly rotating carrier where each tube is accurately aligned between two synchronously rotating chucks by the movement of one of the chucks and is then engaged by both chucks which thereupon rotate the glass tube. The carrier successively advances the series of glass tubes over suitable heating means to fuse the glass of each tube in the region of the desired contraction and when the glass is sufficiently soft the gradual longitudinal movement of one of the synchronously rotating chucks pulls the tube to form a contraction in the fused region. We then prefer to cool the contraction with a stream of air before delivering the glass tube to a suitable container although this is not essential to the successful operation of the machine. The tube is delivered by simultaneously releasing both chucks.

Figure 1:
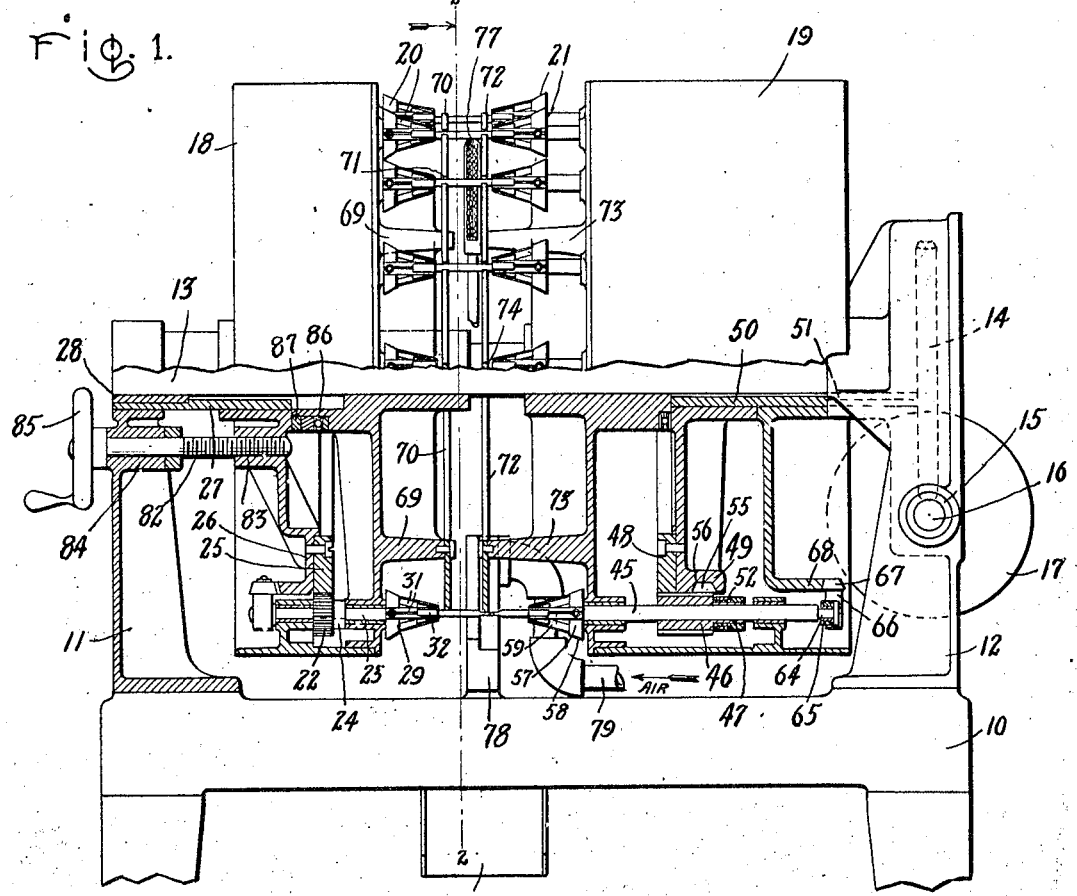
Figure 5:
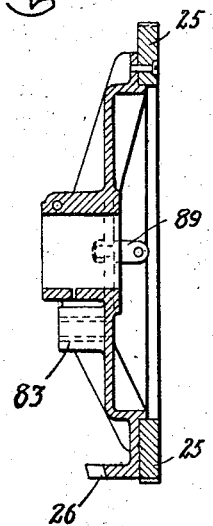
Figure 6:
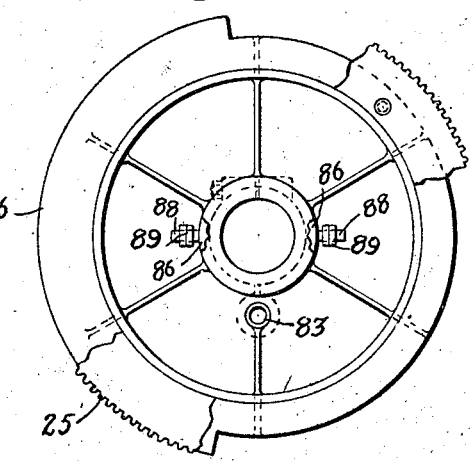

In the accompanying drawing, Fig. 1 is a front elevation partially in section of a machine embodying our invention; Fig. 2 is a sectional elevation on the line 2—2 of Fig. 1; Fig. 3 is an enlarged sectional view of the chuck on the left hand of the machine as shown in Fig. 1; Fig. 4 is a view of the tube end of the chuck of Fig. 3; Fig. 5 is a view of the left hand chuck operating cam; Fig. 6 is a front view of the cam of Fig. 5; Fig. 7 is an enlarged fragmentary view of the chucks showing the total reciprocatory movement of the right hand chuck; Fig. 8 is an enlarged fragmentary view of the chucks showing the reciprocatory movement of the right hand chuck in forming the contraction; Fig. 9 shows the operation performed upon a glass tube blank; Fig. 10 is an end view of a detail of the reciprocating mechanism for the right hand chuck; and Fig. 11 is a developed view of the grooved reciprocating cam.

Referring to the accompanying drawings, the base 10 (Fig. 1) carries the bearing standards 11 and 12 which support the main shaft 13. Fastened to the right end of the main shaft 13 is a worm wheel 14 which is driven by a worm 15 attached to the shaft 16 carried in the bearing standard 12 and driven by a motor and belt (not shown) through the pulley 17. Carried on and driven by the main shaft 13 and properly spaced apart thereon are two drums 18 and 19 in which are carried a series of aligned rotating chucks 20 and 21 respectively. While the position of the drum 19 on the shaft 13 is fixed the drum 18 is free to move longitudinally on the shaft 13 as more fully explained hereinafter.

The chucks 20, of which there are fifteen on the left hand drum 18, are caused to rotate in the following manner. Each chuck 20 has a gear 22 (Figs. 1 and 3) fastened to the main member 23 of the chuck by a split collar 24 and meshing with the stationary gear 25 (see also Fig. 5) fastened to the cam 26, more fully described hereinafter. The cam 26 in turn is fastened to the bearing standard 11 by means of the sleeve 27 concentric with the main shaft 13 but spaced therefrom by a bushing 28. Rotation of the drum 18 causes the gear 22 to revolve about the stationary gear 25 and so rotate the chuck 20. The chuck 20 engages the glass blank 28ª as follows: On the inner end of the chuck 20 (Fig. 3) is fastened a collar 29 with an inclined periphery 30 to which are attached three arms 31 upon which slide the chuck jaws 32 to secure a wedge action.

The jaw 32 has a transverse slot 33 into which fits the disc head 34 of the cap 35 on the end of the central member 36 slidingly held in the main member 23. The disc head 34 also serves to align or position the glass tube blank by limiting the longitudinal motion thereof during engagement. The central member 36 is normally thrust inward, that is, toward the right side of the view of Fig. 3, so as to close the chuck jaws 32 for engaging a blank by the action of a spring 37 wound around the central member 36 and pressing against the shoulder 38 on the cap end thereof and resting on the ring 39 fastened to the inside of the main member 23. The central member is withdrawn so as to open the chuck by the action of the cam 26, previously mentioned, transmitted through the roller 40 (Figs. 1, 3, 4 and 5) on an arm on the crank 41, attached to the end of a rod 42 slidably carried in the drum 18 so as to maintain the alignment of the crank 41. The other arm of the crank 41 is forked to fit a channel bushing 43 on the end member 44 which is fastened over the outer end of the central member 36 and which slides in the main member 23. The outline of the cam 26 is such that the chuck 20 is opened for discharging and held open until loaded in the manner just described. The spring 37 automatically closes the chuck jaws 32 upon the glass tube when the roller 40 is released by the cam 26.

The right hand drum 19 carries the chucks 21 (Fig. 1) of which there are also fifteen. The chucks 21 are similar in construction to and are aligned with the corresponding chucks 20 but have an added function as the drawing of the contraction 44ª in the glass tube 28ª is done by the movement of the chuck 21. The main member 45 of the chuck 21 (Figs. 1, 7 and 8) is rotatably and slidably carried by the drum 19 and has a gear 46 attached by a split collar 47. The gear 46, which is similar to the gear 22, meshes with and is driven by the stationary gear 48, preferably identical with the gear 25, which is attached to the grooved cam 49. The cam 49 is attached to a sleeve 50 which is fastened in the bearing standard 12 concentric with the main shaft 13 but which is separated therefrom by a bushing 51. Rotation of the drum 19 causes rotation of the chucks 21 in a manner similar to the rotation of the chucks 20. The longitudinal movement of the chucks 21 to form the contraction 44ª in the glass tube 28ª is caused as follows. Fastened to the gear 46 and positioned thereon by the split collar 47 is a channel bushing 52 which receives the forked end of an arm of the crank 53 fastened to an aligning tube 54, similar to the aligning rod 42, slidably carried in the drum 19, the other arm of the crank 53 having pinned thereto a roller 55 which fits into and travels in the groove 56 of the grooved cam 49. The cam 49 imparts an intermittent reciprocating rectilinear motion to the main member 45 of the chucks 21 for the purpose of drawing the contraction, of giving clearance to the glass tube at the time of loading, and of receiving the glass tube after loading. The cam groove 56 is shown developed in Fig. 11, the lower end of the drawing taken as the "zero" or starting point is that point on the cam which is perpendicular to the front of the machine or to the paper in the view of Fig. 1. In this specification by "return" is meant the movement outward from a point centrally between the drums 18 and 19 of the machine and by "advance" is meant movement toward this center. In forming a one-half inch contraction on the glass blank, the chuck 21 from the maximum return position is advanced one and one-half inch to engage the glass blank. After heating, the contraction is formed by a one-half inch return of the chuck 21. At about the time of discharging the tube 28ª the chuck 21 is returned one inch further and remains in that position until after the machine is loaded.

It is possible to regulate the internal diameter of the contraction formed in the blank by adjusting the speed of drawing the blank. This may be accomplished by changing the cam groove 56 in the region where the contraction is to be drawn and by changing the speed or rotation of the drum 19. Too hot a fire will cause a small contraction to be formed and too cool a fire will produce a large contraction. It is preferable to draw the contraction gradually or moderately slow as a quick draw will sever the blank and a very slow draw will form a large diameter contraction.

The chuck 21 is caused to hold the glass tube in the following manner. The inner end of the main member 45 (Figs. 1, 2, 7 and 8) has attached thereto a collar 57 with an inclined periphery 58 upon which are fastened three arms 59 having slidably engaging therewith the three chuck jaws 60 each of which has a slot 61 engaging the disc head 62 of the cap 63 on the inner end of the central member (not shown), similar to the central member 36 of the chuck 20. The central member of the chuck 21 slides in the main member 45 which has therein a spring similar to the spring 37 for the purpose of normally holding the jaws 60 in a closed position. As described hereinafter, the disc head 62 of the cap 63 serves to align the glass blank by the advance of the chuck 21 which has been previously described. The chuck opening is accomplished as follows. Sliding in the main member 45 and attached on the outer end of the central member is an end member 64 (Fig. 1) having thereon a channel bushing 65 which receives the forked end of an arm of the crank 66 attached to an aligning rod 66ᵃ slidably carried in the tube 54 previously described. The other arm of the crank 66 has pinned thereto a roller 67 which rides at certain intervals on the stationary cam 68 and causes the chuck jaws 60 to open in a manner similar to the opening of the jaws 32 by the action of the cam 26 on the roller 40 which has previously been described. The cam 68 (Fig. 1) is fastened to the sleeve 50, previously mentioned, between the grooved cam 49 and the bearing standard 12. The chuck 21 is opened for discharging the contraction tube by means of the roller 67 coming in contact and riding upon the cam 68. The action of the cam 68 is such that the chuck 21 is held open until loaded with a glass tube blank and advanced whereupon the roller 67 rides off the cam 68 and the chuck 21 is permitted to be closed by the action of a spring similar to spring 37 of the chuck 20. The cam 68 and the cam 26, previously described, are similar except that the cam 68 permits the right hand chuck 21 to close slightly prior to the closing of the left hand chuck 20. The closing of the chuck 21 prior to the closing of the chuck 20 permits the proper alignment of the glass tube blank with the chuck 21 by which the contraction is drawn, the length from the end of the tube held in the chuck 21 to the contraction being considered important in the future utility of the tube.

The feeding of the machine is accomplished by the following means. Attached to the inner face of the drum 18 and suitably spaced therefrom by standards 69 (Fig. 1) is a disc 70 which has notches 71 on the periphery thereof in alignment with the chucks 20 for receiving one end of the glass tube. A similar disc 72 (see also Fig. 2) attached to the drum 19 by the standards 73 has notches 74 on the periphery thereof in alignment with the chucks 21 for receiving the other end of the glass tube, the chucks 20 and 21 being aligned opposite each other. The glass tube blanks are fed to the rotating notched discs 70 and 72, slightly more to the right of Fig. 1 toward the chucks 21 than centrally on the discs, at the "zero" point previously mentioned by an inclined hopper 75 (Fig. 2) mounted on a bracket 76 carried by the base 10. The blanks are carried by the discs until the proper chuck 21 advances when the disc head 62 thereof aligns and positions the blank relative to both the chuck 21 and the other glass tubes in the machine by advancing the glass tube blank to the left as shown in the dotted lines of Fig. 7. When the longitudinal movement of the chuck 21 has ceased, the chuck 21 and then the chuck 20 closes upon the glass blank.

A gas burner 77 (Figs. 1 and 2) shaped to conform to the curve of the discs 70 and 72 is placed between them and just within the line of their periphery so as to heat the glass tubes from the time they are gripped by the chucks 20 and 21 until just previous to the drawing of the contraction more definitely set forth hereinbefore. The burner 77 is carried by the bracket 76, previously mentioned.

After the contraction is drawn it is preferably cooled by a stream of air from an arc-shaped air jet 78 (Figs. 1 and 2) placed without the line of the periphery of the discs 70 and 72. The jet 78 is attached to the supply pipe 79 which is carried by the base 10.

A chute 80 (Fig. 2) carried by the base 10 receives the contraction tube at the discharge point of the chucks 20 and 21, previously described, and delivers the tube to a suitable container such as a box 81.

For convenience in setting up the machine for operation upon different standard lengths of glass tube blanks, we have preferably provided a screw 82 (Fig. 1) working in a threaded part 83 of the web of the cam 26 and supported rotatably in a bushing 84 in the standard 11. A hand-wheel 85 is attached to the outer end of the screw 82 so that rotation of the wheel 85, which causes the screw 82 to enter or leave the threaded part 83 of the cam 26, causes the cam 26 to move along the sleeve respectively toward or away from the standard 11. Movement of the cam 26 causes movement of the drum 18 in the following manner. The drum 18 has a thrust ball race 86 retained on the hub thereof by the nut 87. The ball race 86 has two diametrically disposed pins 88 which are engaged by the two lugs 89 fastened to the cam 26, the pins 88 being free to remain stationary while the ball race 86 rotates. Thus any longitudinal movement of the cam 26 affects the drum 18 correspondingly. In this way, it is possible to make the machine accommodate longer or shorter tubes.

In operation, the main shaft 13 is driven through the worm wheel 14 and worm wheel 15 and the drums 18 and 19 are thereby rotated. The gear 22 of the chuck 20 meshing with the stationary gear 25 and the gear 46 of the chuck 21 meshing with the stationary gear 48 cause the continuous rotation of the chucks 20 and 21 when the drums 18 and 19 are rotated. The respective gears being identical, the speeds of rotation of the chucks 20 and 21 are equal and synchronous. The glass tubes are placed in the hopper 75 and as the discs 70 and 72 are rotated past the end thereof the notches 71 and 74 carry a tube around the periphery thereof until the chuck 21 advances toward the opposite chuck 20, the disc head 62 of the chuck 21 aligning the glass tube as it moves the tube into the chuck 20. Thereupon, the chuck 21 and then the chuck 20 close on the glass tube and advance it over the gas burner 77 which fuses the predetermined zone of the contraction.

As the tube passes out of the fire, the chuck 21 gradually returns a distance, equal to the desired length of contraction, exerting a gradual longitudinal pull to draw the contraction in the tube. The air jet 78 then cools the contraction. Chucks 20 and 21 now simultaneously release the glass tube and the chuck 21 returns its maximum distance allowing the glass tube to be discharged into the chute 80 which delivers it to a suitable container 81.

While we have disclosed a specific embodiment of our invention, we do not wish to be limited there'o as various modifications thereof will readily suggest themselves to those skilled in the art.

What we claim as new and desire to secure by Letters Patent of the United States, is:—

1. In a glass working machine, means for holding each end of a glass tube blank, means for successively advancing a series of said holders, means for aligning said blanks relative to each other, means for continuously and synchronously rotating said holders during their advancement, means for heating the rotating blanks locally and means for applying a gradual pull longitudinally of the said heated blanks whereby a contraction is formed on each of said blanks.

2. In a glass working machine, the combination with a bed, a shaft rotatably supported thereon and means for rotating said shaft, of two drums mounted on said shaft, a series of pairs of aligned chucks rotatably carried in said drums, a gear mounted on each of said chucks and two stationary gears mounted on said bed and each meshing with the gears of a corresponding series of chucks in each of said drums.

3. In a glass working machine, the combination with a chuck for holding a glass blank comprising means for engaging said blank, means for aligning said blank in said chuck and means for causing said engaging means to close upon said blank, of a second chuck aligned with said first chuck, means for advancing said second chuck upon said first chuck, means for causing the engaging means of said second chuck to close upon said blank prior to the closing of the engaging means of said first chuck, means for returning said second chuck from said first chuck, means for synchronously rotating said chucks, and means external of and corresponding to each chuck for releasing said respective closing means.

4. In a glass working machine, the combination of a pair of substantially vertically disposed disc holders mounted for rotation and having at their peripheries a series of notches arranged in aligned pairs so as to engage and align a glass tube blank, a series of pairs of substantially horizontally disposed aligned chucks each mounted opposite to one of the aforesaid notches and adapted to receive an end of the glass tube blank, carriers for said chucks, means for synchronously rotating said carriers and said disc holders, a heating means disposed in the path of travel of the blanks, means brought into operation after the softening of a blank for causing a change in the proximity of the chucks holding the same to produce a change in form of said blank, and automatic means for causing the release of said chucks to discharge the articles thus produced.

5. In a glass working machine, the combination of a pair of substantially vertically disposed disc holders mounted for rotation and having at their peripheries a series of notches arranged in aligned pairs so as to engage and align a glass tube blank, a series of pairs of substantially horizontally disposed aligned chucks each mounted opposite to one of the aforesaid notches and adapted to receive an end of the glass tube blank, carriers for said chucks, means for synchronously rotating said carriers and said disc holders, a heating means disposed in the path of travel of the blanks, means brought into operation after the softening of a blank for causing a change in the proximity of the chucks holding the same to produce a change in form of said blank, automatic means for causing the release of said chucks to discharge the articles thus produced, and automatic means for feeding tubes to the said disc holders.

In witness whereof, we have hereunto set our hands this second day of February 1921.

JOHN T. FAGAN.
JOHN J. MALLOY.